(No Model.)

C. H. ALLISON.
GATE.

No. 255,481. Patented Mar. 28, 1882.

Witnesses
Geo. H. Strong.
Frank A. Brooks

Inventor
Charles H. Allison
By Dewey & Co. Atty's

UNITED STATES PATENT OFFICE.

CHARLES H. ALLISON, OF ELMIRA, CALIFORNIA.

GATE.

SPECIFICATION forming part of Letters Patent No. 255,481, dated March 28, 1882.

Application filed May 10, 1881. (No model.)

*To all whom it may concern:*

Be it known that I, CHARLES H. ALLISON, of Elmira, Solano county, State of California, have invented an Improvement in Gates; and I do hereby declare the following to be a full, clear, and exact description thereof.

My invention relates to certain improvements in farm-gates; and it consists of a gate made longer than the width of the gate opening, and having one of its bars supported upon rollers or pulleys, so that the gate may be moved back and forward across the gate-opening and balanced upon the rollers. In combination with this sliding gate is a wheel mounted upon a post of the gate-opening, and having ropes or cords wound upon it from opposite sides and leading down beneath pulleys, and thence to the ends of the gate, so that when the wheel is turned by one of the cranks which project to each side the ropes will operate to move the gate upon its rollers, and thus open or close it. In some cases the ropes may pass directly from the wheel to the tops of the gate-posts, which may extend upward.

Figure 1:
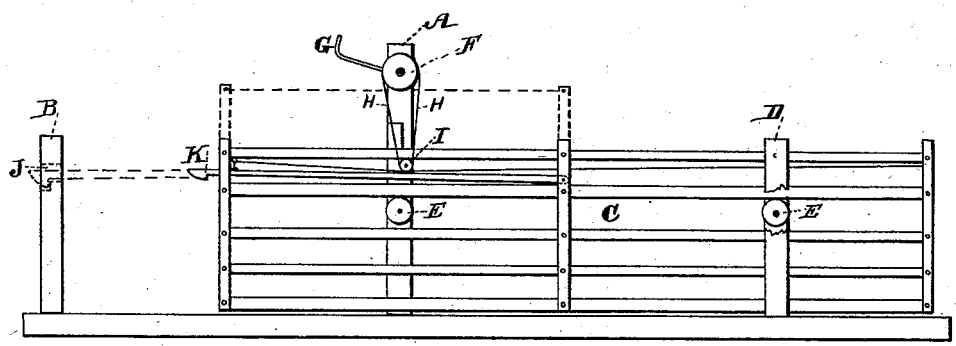
Figure 2:
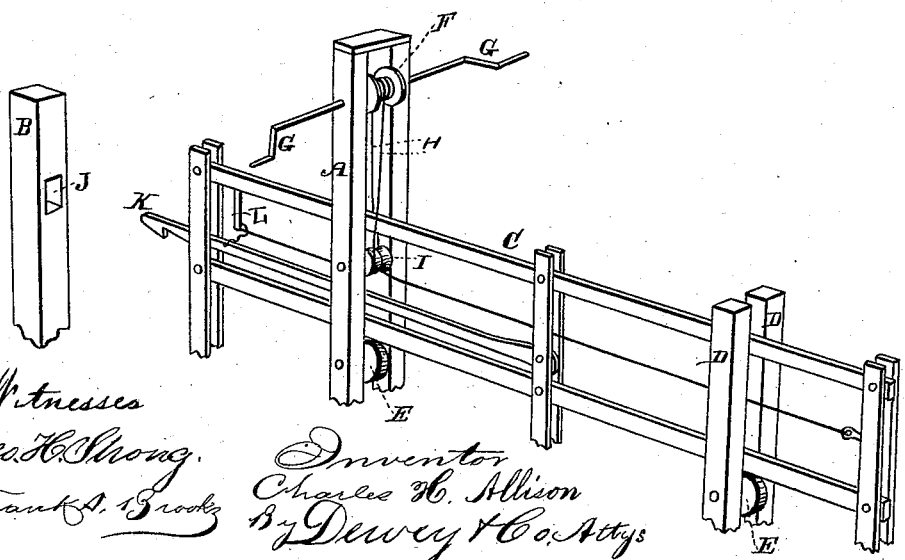

Referring to the accompanying drawings, Figure 1 is a view of my gate, showing the operating-cords passing around pulleys or directly from the drum to the gate-posts. Fig. 2 is a perspective view.

A is the post at the rear of the gate opening, and B is the post against which the gate closes. The gate C is made in two panels, or so that the whole length of the gate is somewhat more than twice the width of the gate-opening, so that when the gate is closed there will be a little more length and weight behind the post A than in front to balance that part which extends across the gate-opening. This rear portion is supported by a post, D, as shown, there being a roller or pulley, E, in this post and one in the post A, upon which one of the longitudinal rails or bars of the gate slides. This construction allows the gate to be moved easily back and forward in line with the fence, and I have found it best to make the two posts A and D double, so that each end of the pulley-shafts will be properly supported.

In order to operate my gate the post A is made high enough to carry a wheel or drum, F, the shaft of which extends out at right angles with the gate to a considerable distance, and it has a crank or pulley upon each end, as shown at G. This shaft may, if desired, be made long enough so that the operating devices G are within reach from a vehicle when the team has been driven up to the gate; or it may be made short. The wheel F has a cord or cords, H, passing around it, and the cords from opposite sides pass beneath pulleys I, leading thence to the extremities of the gate, so that when the wheel F is turned in one direction one of the cords will be wound up and the other will be unwound, thus causing the gate to travel upon its bearing-rollers, so as to open or close. The post B has a catch formed in it at J, and the latch K is made to project through or beyond the end of the gate, so that it will engage the catch and hold the gate when closed. The cord H from the side is attached to the latch, so that the first movement of the wheel F will raise the latch before the gate begins to move. A cog-wheel engaging a rack on the gate may be used, or wire rope and gripe-pulleys, the operation being the same.

Having thus described my invention, what I claim as new, and desire to secure by Letters Patent, is—

The sliding gate C, having the roller-bearings E E and a latch, K, operating substantially as described, the crank-shaft G, carrying the winding-drum F, and arranged above the gate, the pulleys I I, and the cords H H, passing over the drum F and pulleys I, the one rope connecting with the rear of the gate, and the other with the latch K through an eye or equivalent on the projection L, the whole constructed so as to act in combination, whereby upon opening the gate the latch may first be lifted by the cord before a direct pull is exerted upon the gate.

C. H. ALLISON.

Witnesses:
JAS. B. MELVIN,
O. H. ALLISON.